(12) United States Patent
Kim et al.

(10) Patent No.: US 12,509,742 B2
(45) Date of Patent: Dec. 30, 2025

(54) ULTRA-HIGH STRENGTH STEEL SHEET HAVING EXCELLENT SHEAR WORKABILITY AND METHOD FOR MANUFACTURING SAME

(71) Applicant: POSCO, Pohang-si (KR)

(72) Inventors: Sung-Il Kim, Gwangyang-si (KR); Chan-Woo Bang, Gwangyang-si (KR)

(73) Assignee: POSCO CO., LTD, Pohang-si (KR)

( * ) Notice: Subject to any disclaimer, the term of this patent is extended or adjusted under 35 U.S.C. 154(b) by 683 days.

(21) Appl. No.: 17/436,348

(22) PCT Filed: Apr. 21, 2020

(86) PCT No.: PCT/KR2020/005248
§ 371 (c)(1),
(2) Date: Sep. 3, 2021

(87) PCT Pub. No.: WO2020/226301
PCT Pub. Date: Nov. 12, 2020

(65) Prior Publication Data
US 2022/0186335 A1      Jun. 16, 2022

(30) Foreign Application Priority Data
May 3, 2019   (KR) .................. 10-2019-0051978

(51) Int. Cl.
*C21D 9/46*    (2006.01)
*C21D 6/00*    (2006.01)
(Continued)

(52) U.S. Cl.
CPC ............... *C21D 9/46* (2013.01); *C21D 6/002* (2013.01); *C21D 6/005* (2013.01); *C21D 6/008* (2013.01);
(Continued)

(58) Field of Classification Search
CPC ...... C21D 1/02; C21D 8/0263; C21D 8/0247; C21D 2211/001; C21D 9/46; C21D 6/002;
(Continued)

(56) References Cited

U.S. PATENT DOCUMENTS

2014/0007993 A1    1/2014  Nakajim et al.
2016/0076124 A1 *  3/2016  Yamazaki ............... C22C 38/58
                                               148/330
(Continued)

FOREIGN PATENT DOCUMENTS

CN          101871078 A      10/2010
DE       10-2005-031462 A1    1/2007
(Continued)

OTHER PUBLICATIONS

Philip, Ultrahigh-Strength Steels (Year: 1990).*
(Continued)

*Primary Examiner* — Ricardo D Morales
(74) *Attorney, Agent, or Firm* — Morgan Lewis & Bockius LLP

(57) ABSTRACT

The present invention relates to a steel sheet which is suitable to be used as the material of a part such as a friction plate for a vehicle automatic transmission. More specifically, the present invention relates an ultra-high strength steel sheet having excellent shear workability and a method for manufacturing same.

7 Claims, 1 Drawing Sheet

(51) Int. Cl.
 *C21D 8/02*  (2006.01)
 *C22C 38/00*  (2006.01)
 *C22C 38/02*  (2006.01)
 *C22C 38/06*  (2006.01)
 *C22C 38/26*  (2006.01)
 *C22C 38/28*  (2006.01)
 *C22C 38/32*  (2006.01)
 *C22C 38/38*  (2006.01)

(52) U.S. Cl.
 CPC ......... *C21D 8/0205* (2013.01); *C21D 8/0226* (2013.01); *C21D 8/0236* (2013.01); *C22C 38/001* (2013.01); *C22C 38/002* (2013.01); *C22C 38/02* (2013.01); *C22C 38/06* (2013.01); *C22C 38/26* (2013.01); *C22C 38/28* (2013.01); *C22C 38/32* (2013.01); *C22C 38/38* (2013.01); *C21D 2211/002* (2013.01); *C21D 2211/008* (2013.01)

(58) Field of Classification Search
 CPC ...... C21D 6/005; C21D 6/008; C21D 8/0205; C21D 8/0226; C21D 8/0236; C21D 2211/002; C21D 2211/008; C21D 2211/009; C22C 38/04; C22C 33/04; C22C 38/001; C22C 38/002; C22C 38/02; C22C 38/06; C22C 38/26; C22C 38/28; C22C 38/32; C22C 38/38
See application file for complete search history.

(56) References Cited

U.S. PATENT DOCUMENTS

| | | | |
|---|---|---|---|
| 2017/0009316 | A1 | 1/2017 | Yamazake et al. |
| 2019/0136339 | A1 | 5/2019 | Kim et al. |
| 2019/0203315 | A1 | 7/2019 | Obata et al. |
| 2019/0203317 | A1* | 7/2019 | Yoshioka ............... C23C 2/40 |
| 2019/0241996 | A1 | 8/2019 | Sano et al. |
| 2021/0254200 | A1 | 8/2021 | Xue et al. |

FOREIGN PATENT DOCUMENTS

| | | |
|---|---|---|
| EP | 2617850 A1 | 7/2013 |
| JP | 2002-030347 A | 1/2002 |
| JP | 2007-191781 A | 8/2007 |
| JP | 2012-62562 A | 3/2012 |
| JP | 2018-538441 A | 12/2018 |
| JP | 2021-528562 A | 10/2021 |
| KR | 10-2000-0043430 A | 7/2000 |
| KR | 10-2013-0106626 A | 9/2013 |
| KR | 10-1304822 B1 | 9/2013 |
| KR | 10-2015-0001469 A | 1/2015 |
| KR | 10-2016-0041850 A | 4/2016 |
| KR | 10-2017-0059528 A | 5/2017 |
| KR | 10-1910444 B1 | 10/2018 |
| KR | 10-2019-0016099 A | 2/2019 |
| KR | 10-2019-0028758 A | 3/2019 |
| WO | 2017/086745 A1 | 5/2017 |
| WO | 2018/026016 A1 | 2/2018 |
| WO | 2018/062381 A1 | 4/2018 |
| WO | 2020/129402 A1 | 6/2020 |
| WO | 2020/129403 A1 | 6/2020 |

OTHER PUBLICATIONS

Kloeckner metals. Types of High Strength Steels in Cars (Year: 2021).*

International Search Report dated Sep. 11, 2020 issued in International Patent Application No. PCT/KR2020/005248 (with English translation).

Chinese Office Action dated Feb. 21, 2022 issued in Chinese Patent Application No. 202080028899.1.

Extended European Search Report dated May 24, 2022 issued in European Patent Application No. 20802146.9.

Japanese Office Action dated Sep. 6, 2022 issued in Japanese Patent Application No. 2021-549622.

* cited by examiner

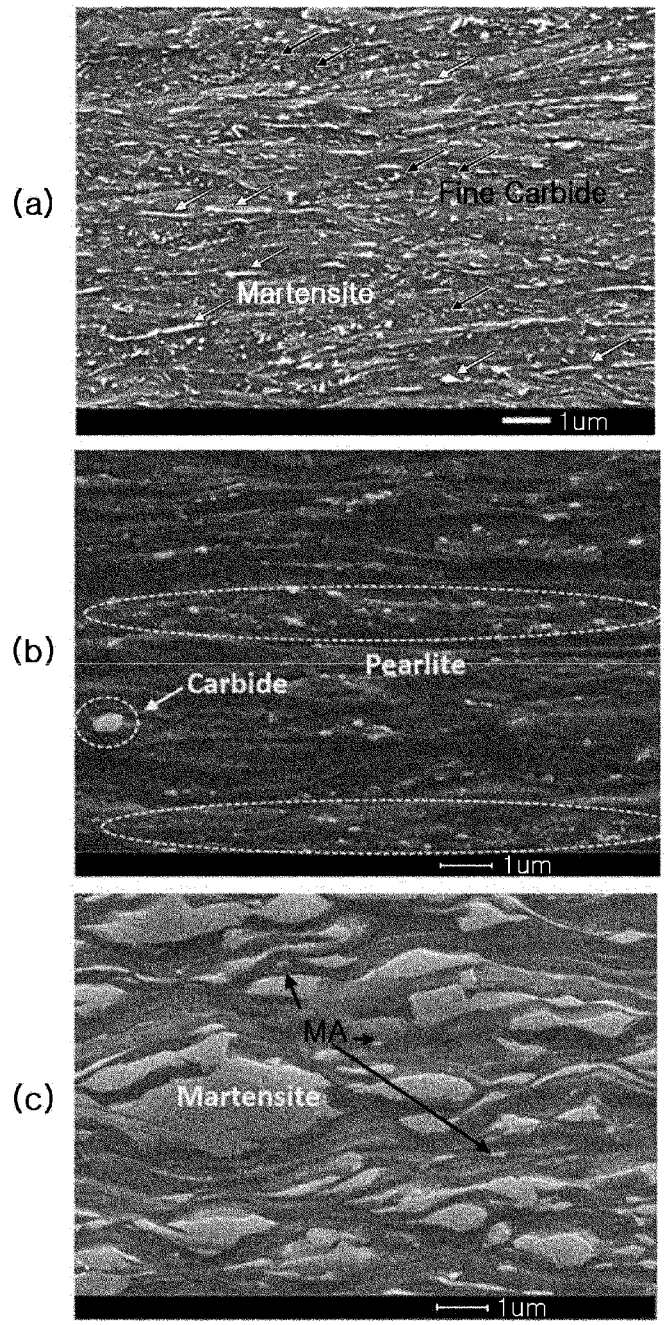

ULTRA-HIGH STRENGTH STEEL SHEET HAVING EXCELLENT SHEAR WORKABILITY AND METHOD FOR MANUFACTURING SAME

CROSS-REFERENCE OF RELATED APPLICATIONS

This application is the U.S. National Phase under 35 U.S.C. § 371 of International Patent Application No. PCT/KR2020/005248, filed on Apr. 21, 2020, which in turn claims the benefit of Korean Application No. 10-2019-0051978, filed on May 3, 2019, the entire disclosures of which applications are incorporated by reference herein.

TECHNICAL FIELD

The present disclosure relates to a steel sheet appropriately used as a material for a friction plate, or the like, of an automatic transmission, and more particularly, to an ultra-high strength steel sheet having excellent shear workability and a method for manufacturing the same.

BACKGROUND ART

Steel sheets, used for friction plates of the automatic transmissions of automobiles, are required to have high strength and high hardness while having no fatigue fracture during use thereof because of less occurrence of cracking caused by shearing.

In the related art, as disclosed in Patent Document 1, a technology, in which medium carbon steel or steel including various alloying elements is cold rolled and then annealed by a recovery annealing method, has been applied to a high-strength cold-rolled steel sheet used for a friction plate or guaranteeing hardness.

In addition, a method of performing a spheroidizing heat treatment on high carbon steel has generally been used. Patent Document 2 has proposed a technology in which cold rolling is performed twice in a process of cold rolling, annealing, and cold rolling.

However, when a recovery annealing method is used as disclosed in Patent Document 1, it is difficult to manufacture an ultra-high strength steel sheet. In addition, a technology to perform a spheroidizing heat treatment using high carbon steel or a technology to perform cold rolling twice, as disclosed in Patent Document 2, incurs significantly high manufacturing costs.

Alloying elements, such as carbon (C), silicon (Si), manganese (Mn), molybdenum (Mo), and chromium (Cr), are mainly added as an alloy composition to manufacture a cold-rolled high-strength steel sheet. In this case, solid-solution strengthening is improved to result in an effect of increasing strength of a steel sheet.

However, the excessive addition of such elements causes segregation of the alloy composition and formation of non-uniform microstructures. In particular, ferrite phase transformation is significantly delayed because of an increase in the hardenability of steel during cooling, so that low-temperature phases (martensite, and the like) are formed and grain boundaries become non-uniform. Thus, the occurrence of cracking in an interface between a low-hardness ferrite phase and a low-temperature structure phase having high hardness is increased during a shearing process.

In addition, when frictional heat is generated and a contact fatigue is accumulated during use, cracking is easily propagated to cause defects.

Moreover, when precipitation strengthening elements such as titanium (Ti), niobium (Nb), and vanadium (V) are inappropriately added to further improve physical properties of steel, coarse carbides, nitrides, and precipitates are formed in grain boundaries to increase occurrence of cracking and to facilitate propagation of cracking during a shearing process.

Accordingly, there is a need for a technology to significantly reduce occurrence of microcracking and to significantly decrease a maximum length of cracks. Furthermore, when microcracking occurs in a minimum amount but is parallel to a steel sheet, a sheared surface may be worn. Accordingly, there is a need for development of a technology to prevent the sheared surface from being worn.

(Patent Document 1) Korean Patent Publication No. 2000-0043430

(Patent Document 2) German Patent Application No. 10-2005-031462

DISCLOSURE

Technical Problem

An aspect of the present disclosure is to provide an ultra-high strength steel sheet, having excellent shear workability, capable of suppressing cracking caused by shearing, and a method for manufacturing same.

An object of the present disclosure is not limited to the above description. Other objects of the present invention are described in overall contents of the specification, and it will not difficult at all for a person with ordinary skill in the art to which the present disclosure pertains to understand the objects of the present disclosure from the descriptions of the specification of the present disclosure.

Technical Solution

According to an aspect of the present disclosure, an ultra-high strength steel sheet, having excellent shear workability, includes, by weight %, carbon (C): 0.06 to 0.14%, silicon (Si): 0.1 to 0.8%, manganese (Mn): 1.6 to 2.2%, chromium (Cr): 0.005 to 0.8%, phosphorus (P): 0.001 to 0.05%, sulfur (S): 0.001 to 0.01%, aluminum (Al): 0.01 to 0.1%, nitrogen (N): 0.001 to 0.01%, titanium (Ti): 0.01 to 0.06%, niobium (Nb): 0.005 to 0.06%, boron (B): 0.0003 to 0.0050%, and a balance of iron (Fe) and unavoidable impurities.

The ultra-high strength steel sheet includes a bainite phase in an area fraction of 80% or more as a microstructure, and includes a martensite phase in an area fraction of 10% or less, a retained austenite phase in an area fraction of 5% or less, and a ferrite phase in an area fraction of 5% or less as a remainder.

According to another aspect of the present disclosure, a method for manufacturing an ultra-high strength steel sheet having excellent shear workability includes: heating a steel slab having the above-described alloy composition; finish-rolling the heated steel slab within a temperature range of 800 to 1150° C. to manufacture a hot-rolled steel sheet; cooling the hot-rolled steel sheet, and then coiling the cooled hot-rolled steel sheet; and cold-rolling the coiled hot-rolled steel sheet to manufacture a cold-rolled steel sheet.

The cooling is performed at an average cooling rate $CR_{Min}$, satisfying Relation Expression 1 below, or higher, and is performed to a temperature range of $CT_{Min}$ to $CT_{Max}$ satisfying Relational Expression 2 below, $$CR_{Min}=190-(105\times[C])+(35\times[Si])-(58\times[Mn])-(46\times[Cr])+(15\times[Ti])+(50\times[Nb])-(150\times[B]) \quad \text{[Relational Expression 1]}$$

$$CT_{Max}=510-(120\times[C])+(30\times[Si])-(25\times[Mn])-(22\times[Cr])+(8.5\times[Ti])+(14\times[Nb])+(805\times[B])$$

$$CT_{Min}=420-(45.3\times[C])+(16\times[Si])-(21\times[Mn])-(18\times[Cr]) \quad \text{[Relational Expression 2]}$$

where in Relational Expressions 1 and 2, each element denotes a content by weight %).

Advantageous Effects

As set forth above, the present disclosure provides an ultra-high strength steel sheet securing strength and hardness of a cold-rolled steel sheet and having significantly improved shearing characteristics.

In particular, the present disclosure is economically favorable because desired physical properties may be secured without performing a general annealing process.

DESCRIPTION OF DRAWINGS

FIG. 1 is an image of observing microstructures of inventive steel according to an example embodiment of the present disclosure and conventional steels (A: Inventive Steel 5, B: Conventional Steel 1 (ferrite-pearlite precipitation strengthening steel), C: Conventional Steel 2 (bainitic ferrite-martensite complex-phase steel)

BEST MODE

The inventors of the present disclosure have investigated a relationship between an alloy composition and a manufacturing method. To this end, a hot-rolled steel sheet having various alloy compositions and a second phase (for example, ferrite, pearlite, martensite, and the like) was picked and then cold-rolled at a reduction ratio of 60 to 70% to manufacture a cold-rolled steel sheet. A microstructure and physical properties of the steel sheet were measured. Additionally, a shearing forming process of shearing the cold-rolled steel sheet and heating the sheared steel sheet at a temperature of 200° C. for an hour was performed, and then a microstructure of a sheared portion was measured.

In conclusion, it was confirmed that the physical properties and microstructure of the cold-rolled steel sheet varied depending on the alloy composition, and a second phase of an initial hot-rolled steel sheet and a fraction thereof. In particular, it was confirmed that, when a tempered bainite structure and a tempered martensite structure were formed in a microstructure of the initial hot-rolled steel sheet, the amount of work hardening tended to decrease to the extent that strength of steel was increase during cold rolling.

It was also confirmed that, when the cold-rolled steel sheet was subjected to a shearing forming process, occurrence of cracking in a sheared portion was highly dependent on the coarse carbide and the phase fractions of pearlite structures and a martensite structures in a microstructure. The structures were formed during phase transformation in a cooling process after a hot rolling process, and were in proportion to a component composition of carbon (C), manganese (Mn), chromium (Cr), boron (B), and the like, in steel. Accordingly, when the contents of the above components were reduced, it was difficult to secure strength and hardness of the steel.

In addition, as the content of silicon (Si) in the steel was insufficient or the contents of titanium (Ti) and niobium (Nb) were low, formation of a tempered structure and coarse carbides became more severe, so that occurrence of cracking in a sheared portion was increased.

Based thereon, the inventors of the present disclosure found that the alloy composition of the steel was further optimized to secure an appropriate solid-solution strengthening effect in the steel, and manufacturing conditions were further optimized to suppress formation of a ferrite phase disadvantageous in securing initial strength, so that a steel sheet having desired ultra-high strength and high hardness and excellent shear workability may be provided without performing an additional process (for example, an annealing heat treatment process). As a result, the inventors conceived of the present disclosure.

Hereinafter, the present disclosure will be described in detail.

An ultra-high strength steel sheet having excellent shear workability according to an aspect of the present disclosure may include, by weight %, carbon (C): 0.06 to 0.14%, silicon (Si): 0.1 to 0.8%, manganese (Mn): 1.6 to 2.2%, chromium (Cr): 0.005 to 0.8%, phosphorus (P): 0.001 to 0.05%, sulfur (S): 0.001 to 0.01%, aluminum (Al): 0.01 to 0.1%, nitrogen (N): 0.001 to 0.01%, titanium (Ti): 0.01 to 0.06%, niobium (Nb): 0.005 to 0.06%, and boron (B): 0.0003 to 0.0050%.

Hereinafter, the reason for controlling the alloy composition of the above-described steel sheet will be described in detail.

The content of each element in the present disclosure indicates weight % and a ratio of each structure indicates an area ratio, unless otherwise specified.

Carbon (C): 0.06 to 0.14%

Carbon is most effective and economical in strengthening steel. When the content of carbon is increased, a precipitation strengthening effect may be improved or fractions of bainite, martensite, and retained austenite phases, low-temperature structure phases, may be increased to improve tensile strength.

When the content of carbon is less than 0.06%, the precipitation strengthening effect may be low and formation of a low-temperature structure may be reduced, so that a desired level of strength may not be secured. On the other hand, when the content of carbon is greater than 0.14%, coarse carbides may be easily formed at grain boundaries and a pearlite phase may also be formed, so that microcracking may occur in an interface of the coarse carbides during a shearing process to result in poor shear workability.

Accordingly, carbon may be contained in an amount of 0.06 to 0.14%, more advantageously 0.07% or more, and even more advantageously 0.08% or more. A more detailed upper limit of carbon may be 0.13%.

Silicon (Si): 0.1 to 0.8%

Silicon has an effect of deoxidizing molten steel and a solid-solution strengthening effect, and delays formation of coarse carbides to be advantageous in improving formability.

When the content of silicon is less than 0.1%, an effect of delaying formation of carbides is reduced, so that it may be difficult to improve the formability. On the other hand, when the content of silicon is greater than 0.8%, a red scale caused by silicon may be formed on a surface of a steel sheet during a hot-rolling process, so that surface quality of the steel sheet may be significantly deteriorated and ductility and weldability may also be deteriorated.

Accordingly, silicon may be contained in an amount of 0.1 to 0.8%, more advantageously, 0.2 to 0.7%.

Manganese (Mn): 1.6 to 2.2%

Similarly to silicon, manganese is effective in solid-solution strengthening of steel, and increases hardenability of the steel to facilitate formation of a bainite phase and a martensite phase.

When the content of manganese is less than 1.6%, the above-described effects may be insufficiently obtained. On the other hand, when the content of manganese is greater than 2.2%, the hardenability may be significantly increased to delay ferrite phase transformation, so that an excessive martensite phase and a martensite-austenite (MA) phase may be easily formed, and a local microstructure and a mechanical property deviation may be increased. In addition, in a casting process, a segregation portion may be significantly developed in a thickness center portion when a slab is cast. When a cooling process is performed after a hot-rolling process, a microstructure may be formed to be non-uniform in a thickness direction to significantly increase occurrence of cracking during a shearing process.

Accordingly, manganese may be contained in an amount of 1.6 to 2.2%, more advantageously, 1.8 to 2.2%.

Chromium (Cr): 0.005 to 0.8%

Chromium has a solid-solution strengthening effect on steel and increase hardenability of the steel. Therefore, chromium is effective in improving strength of the steel. To obtain the above effects, chromium may be contained in an amount of, in detail, 0.005% or more. However, when the content of chromium is greater than 0.8%, ferrite transformation may be excessively delayed to increase occurrence of cracking during a shearing process due to formation of an excessive martensite phase, so that quality of a sheared surface may be deteriorated. In addition, similarly to manganese, a segregation portion may be significantly developed in a thickness center portion, and a microstructure may be formed to be non-uniform in a thickness direction, so that shear workability may be deteriorated.

Accordingly, chromium may be contained in an amount of 0.005 to 0.8%, more advantageously, 0.7% or less, and, even more advantageously, 0.6% or less. A more detailed lower limit of chromium may be 0.01%.

Phosphorus (P): 0.001 to 0.05%

Phosphorus is an element having both a solid-solution strengthening effect and a ferrite transformation promoting effect. To control the content of phosphorus to be less than 0.001%, high manufacturing costs may be incurred. Therefore, it may be economically unfavorable and it may be difficult to secure a desired level of strength. On the other hand, when the content of phosphorus is greater than 0.05%, embrittlement may occur due to grain boundary segregation, microcracking may easily occur during a shearing process, and ductility and impact resistance characteristics may be significantly deteriorated.

Accordingly, phosphorus may be contained in an amount of 0.001 to 0.05%.

Sulfur (S): 0.001 to 0.01%

Sulfur is an impurity present in steel. When the content of sulfur is greater than 0.01%, sulfur may combine with manganese, or the like, to form a non-metallic inclusion, so that microcracking may easily occur during a cutting process of steel and impact resistance may be significantly decreased. On the other hand, to control the content of sulfur to be less than 0.001%, a steel-making process may require an excessive amount of time, and thus, productivity may be lowered.

Accordingly, sulfur may be contained in an amount of 0.001 to 0.01%.

Aluminum (Al): 0.01 to 0.1%

Aluminum is an element mainly added for deoxidation. When the content of aluminum is less than 0.01%, the addition effect may be insufficient. On the other hand, when the content of aluminum is greater than 0.1%, aluminum may combine with nitrogen (N) in steel to form AlN, so that corner cracking may occur in a slab during a continuous casting process and defects may easily occur in edge portions of a hot-rolled steel sheet due to formation of inclusions. In addition, surface defects may occur during a cold-rolling process after a hot-rolling process, resulting in poor surface quality.

Accordingly, aluminum may be contained in an amount of 0.01 to 0.1%.

In the present disclosure, aluminum refers to soluble aluminum (Sol.Al).

Nitrogen (N): 0.001 to 0.01%

Together with carbon (C), nitrogen is a typical element for solid-solution strengthening and combines with titanium (Ti), aluminum (Al), or the like, to form coarse precipitates. In general, a solid-solution strengthening effect of nitrogen is greater than that of carbon, but toughness of steel is decreased as the content of nitrogen in the steel is increased. For this reason, nitrogen may be contained in an amount of, in detail, 0.01% or less. However, it may take a large amount of time to make steel containing nitrogen in an amount of less than 0.001%, and thus, productivity may be reduced.

Accordingly, nitrogen may be contained in an amount of 0.001 to 0.01%.

Titanium (Ti): 0.01 to 0.06%

Together with niobium (Nb), titanium is a typical element for precipitation strengthening and forms coarse TiN due to strong affinity to nitrogen (N). TiN has an effect of suppressing growth of grains during a heating process for hot rolling. When boron (B) is added, titanium prevents boron from forming nitrides, and thus, boron may advantageously improve hardenability. In addition, titanium remaining after reacting with nitrogen may be solid-solubilized in steel and may combine with carbon to form a TiC precipitate, which is effective in improving strength of the steel.

To sufficiently obtain the above effect, titanium needs to be contained in an amount of 0.01% or more. However, when the content of titanium is greater than 0.06%, coarse TiN may be formed to deteriorate shear workability during a shearing process.

Accordingly, titanium may be contained in an amount of 0.01 to 0.06%, more advantageously, 0.05% or less, and, even more advantageously, 0.03% or less.

Niobium (Nb): 0.005 to 0.06%

Niobium is a precipitation strengthening element. During a hot-rolling process, niobium precipitates and delays recrystallization, thereby having a grain refinement effect to be advantageous in improving strength and impact toughness of steel. To sufficiently obtain such an effect, niobium may be contained in an amount of 0.005% or more. On the other hand, when the content of niobium is greater than 0.06%, recrystallization may be excessively delayed during a hot-rolling process to deteriorate shear workability due to formation of elongated grains and coarse complex precipitates.

Accordingly, niobium may be contained in an amount of 0.005 to 0.06%, more advantageously, 0.01 to 0.05.

Boron (B): 0.0003 to 0.0050%

Boron is a strong hardenability element. Even when a small amount of boron is contained, hardenability may be improved. Boron may segregate along grain boundaries in steel to delay ferrite phase transformation during a cooling process, and thus, may increase hardenability to be effective in improving strength. To sufficiently obtain the above effect, boron may be contained in an amount of 0.0003% or more. However, when the content of boron is greater than 0.0050%, the above effect may be saturated and, rather, elongation of the steel may be significantly decreased. In addition, carbides and nitrides may be excessively formed to deteriorate shear workability.

Accordingly, boron may be contained in an amount of 0.0003 to 0.0050%, more advantageously, 0.0010 to 0.0030%.

In the present disclosure, the other component of the steel is iron (Fe). However, impurities in raw materials or manufacturing environments may be inevitably included in the steel, and such impurities may not be able to be removed from the steel, such impurities are well-known to those of ordinary skill in the art to which the present disclosure pertains, and thus descriptions thereof will not be given in the present disclosure.

The steel sheet according to the present disclosure, having the above-described alloy composition, may have a microstructure including a bainite phase as a main phase and a martensite phase as a remainder.

The steel sheet according to the present disclosure may include the bainite phase in an area fraction of 80% or more, and the martensite phase in an area fraction of 10% or less. In addition, the steel sheet according to the present disclosure may include at least one of a retained austenite phase, a ferrite phase, and a pearlite phase as a residual structure, other than the bainite phase and the martensite phase. In this case, each of the retained austenite phase and the ferrite phase may be included in an area fraction of 5% or less.

When the fraction of the bainite is less than 80%, it may be difficult to secure desired ultra-high strength. When the fractions of the martensite phase and the ferrite phase are relatively increased, the structure may be formed to be non-uniform, and thus, microcracking may easily occur in a sheared portion during a shearing process.

That is, according to the present disclosure, formation of the ferrite phase and the martensite phase, disadvantageous in securing initial strength, may be suppressed to significantly reduce occurrence of microcracking during the shearing process.

The steel sheet according to the present disclosure may include the bainite phase in an area fraction of 100%.

In particular, in the steel sheet according to the present disclosure, pearlite including carbides each having an equivalent circular diameter of 0.1 μm or more in the microstructure may be formed in an area fraction of less than 5% to significantly suppress occurrence of microcracking caused by coarse carbides and a pearlite structure.

The term "diameter" refers to an average equivalent circular diameter.

The steel sheet according to the present disclosure, having the above-described microstructure, may have ultra-high strength with a tensile strength of 1350 MPa or more, and a Vickers hardness value of 360 Hv or more, and thus, may be appropriately used for a friction plate, or the like.

In addition, the steel sheet may have excellent shear workability because a maximum length of cracks formed during a shearing process is 0.1 mm or less.

That is, in the steel sheet according to the present disclosure, the amount of cracking occurring during the shearing process may be significantly reduced to suppress propagation of the cracking.

Hereinafter, a method for manufacturing an ultra-high strength steel sheet having excellent shear workability, another aspect of the present disclosure, will be described in detail.

A steel sheet according to the present disclosure may be manufactured by performing heating, hot-rolling, cooling, and cold-rolling processes on a steel slab satisfying an alloy composition proposed in the present disclosure, and the present disclosure may be economically favorable because an additional process (for example, an annealing heat treatment process, or the like) is performed after the cold-rolling process.

Hereinafter, each process condition will be described in detail.

Steel Slab Heating

In the present disclosure, a heating process of heating a steel slab to be homogenized may be preferably performed before performing a hot-rolling process. In this case, the heating process may be performed within the temperature range of 1100 to 1350° C.

When the heating temperature of the steel slab is less than 1100° C., precipitates may be insufficiently solid-solubilized again, so that formation of precipitates may be reduced in a process subsequent to a hot-rolling process and coarse TiN may remain. On the other hand, when the heating temperature is higher than 1350° C., it may be not preferable because strength is lowered by abnormal grain growth of austenite grains.

Hot Rolling

The reheated steel slab may be preferably hot rolled to be manufactured as a hot-rolled steel sheet. In this case, finish hot rolling may be performed within the temperature range of 800 to 1150° C.

When the hot rolling is performed at a temperature higher than 1150° C., the temperature of the hot-rolled steel sheet may be increased to coarsen a grain size and to deteriorate surface quality of the hot-rolled steel sheet. On the other hand, when the hot rolling is performed at a temperature lower than 800° C., elongated crystal grains may be developed by excessive recrystallization delay to increase generation of a load during the hot rolling. Thus, it may be difficult to perform rolling, a shape may become poor, and elongated grains may be formed to deteriorate shear workability after a cold-rolling process.

Cooling and Coiling

The hot-rolled steel sheet obtained by performing the hot rolling may be cooled, and then coiled at that temperature.

In the present disclosure, to suppress the occurrence of microcracking during a shearing process subsequent to a cold-rolling process by forming a uniform microstructure, the hot-rolled steel sheet may be preferably cooled to a temperature between $CT_{Min}$ and $CT_{Max}$, obtained by Relational Expression 2 below, at an average cooling rate during the cooling higher than $CR_{Min}$, obtained by Relational Expression 1, and then may be preferably coiled at that temperature.

$$CR_{Min}=190-(105\times[C])+(35\times[Si])-(58\times[Mn])-(46\times[Cr])+(15\times[Ti])+(50\times[Nb])-(150\times[B]) \quad \text{[Relational Expression 1]}$$

$$CT_{Max}=510-(120\times[C])+(30\times[Si])-(25\times[Mn])-(22\times[Cr])+(8.5\times[Ti])+(14\times[Nb])+(805\times[B])$$

$$CT_{Min}=420-(45.3\times[C])+(16\times[Si])-(21\times[Mn])-(18\times[Cr]) \quad \text{[Relational Expression 2]}$$

where in Relational Expressions 1 and 2, each element denotes a content by weight %.

In the present disclosure, Relational Expression 1 may affect securing of hardenability of steel and formation of a bainite phase as a matrix structure. Each of the elements, constituting Relational Expression 1, may be effective in securing solid-solution strengthening of the steel. Among the elements, carbon (C), manganese (Mn), chromium (Cr), and boron (B) may be advantageous in securing hardenability.

When the hot-rolled steel sheet is cooled, the cooling rate may employ a rate greater than or equal to a value $CR_{Min}$ obtained from Relational Expression 1, for example, a cooling rate higher than a result calculated by Relational Expression 1, and thus, phase transformation of ferrite, disadvantageous in securing initial strength, may be significantly reduced and a bainite phase may be easily formed.

Therefore, the cooling may be preferably performed at Relational Expression 1 or more, affected by the alloy composition, more advantageously, a cooling rate higher than 70° C./sec, and, even more advantageously, a cooling rate of 75° C./sec or more. However, when the cooling rate is higher than 120° C./sec, a microstructure may be formed to be non-uniform between a thickness surface layer portion and a central portion of the steel, and thus, microcracking may easily occur during a shearing process after the cold rolling. In addition, it may be difficult to secure a temperature higher than or equal to $CT_{Min}$ of Relational Expression 2.

In addition, Relational Expression 2 may affect formation of coarse carbides and a pearlite structure in steel and formation of an excessive martensite phase in the steel. In Relational Expression 2, $CT_{MAX}$ and $CT_{MIN}$ not only represent the range of a cooling end temperature, but also refer to upper and lower limits of the coiling temperature.

In the present disclosure, a coiling process may be performed after the cooling of the hot-rolled steel sheet is finished at a temperature satisfying Relational Expression 2, and thus, the formation of coarse carbides and pearlite and the formation of a coarse martensite phase may be suppressed. In particular, occurrence of cracking in a sheared portion may be significantly reduced during a shearing process of a cold-rolled steel sheet obtained by subsequent cold rolling.

In the cooling process performed at a cooling rate greater than or equal to a value obtained from Relational Expression 1, when the cooling process is finished at a temperature higher than $CT_{MAX}$ of Relational Expression 2, solid-solubilized carbon in an untransformed phase may form carbides or a pearlite structure to be disadvantageous in securing strength of the steel and to result in easy occurrence of cracking during the shearing process. Meanwhile, when the cooling process is finished at a temperature lower than $CT_{MIN}$ of Relational Expression 2, an untransformed phase may be transformed into a martensite phase result in easy occurrence of cracking during the shearing process while being in advantageous in securing strength.

Therefore, the coiling process after the above-described cooling process may be preferably performed within the temperature range based on Relational Expression 2, more advantageously, within the temperature range of 400 to 500° C.

According to the present disclosure, the coiling process may be performed within the temperature range based on Relational Expression 2 to promote the formation of the bainite phase. In this case, the temperature range may be controlled to be 400 to 500° C., in further detail, 400 to 450° C. to form a more uniform bainite phase.

Cold Rolling

The hot-rolled steel sheet, cooled and coiled as described above, may be cold rolled to manufacture a cold-rolled steel sheet.

A pickling process may be further performed on the coiled hot-rolled steel sheet, and the cold-rolling process may be performed at a cold-rolling reduction ratio of 60 to 80%.

When the cold-rolling reduction ratio is less than 60%, a work hardening effect may be insufficiently secured, and thus, desired levels of strength and hardness may not be secured. On the other hand, when the cold-rolling reduction ratio is greater than 80%, the quality of an edge portion of the steel may be deteriorated and shear workability may become poor.

When the hot-rolled steel sheet cooled and coiled as proposed in the present disclosure is cold rolled according to the above, an increase of strength by cold rolling (reduction ratio, %) is 6 MPa/1% or more, so that tensile strength of the final cold-rolled steel sheet may be secured to be 1350 MPa or more.

Hereinafter, the present disclosure will be described more specifically by way of examples. It should be noted that the following examples are intended to illustrate the present disclosure in more detail and to not limit the scope of the present disclosure. The scope of the present disclosure may be determined by the matters described in the claims and the matters reasonably deduced therefrom.

MODE FOR INVENTION

Example

A steel slab having an alloy composition of Table 1 was prepared. In this case, the content of the alloy composition is weight %, and the balance may include iron (Fe) and unavoidable impurities. After the prepared steel slab was heated at a temperature of 1200° C., hot rolling and cold rolling processes were performed under the manufacturing conditions listed in Table 2 below to manufacture steel sheets, respectively. In this case, a cold-rolling reduction ratio of 67% was applied to all steels, the hot-rolled sheet obtained by the hot rolling had a thickness of 3.1 to 3.3 mm, and the cold-rolled sheet obtained by the cold rolling had a thickness of about 1 mm.

In Table 2 below, FDT refers to a temperature during a finish hot-rolling process (a hot rolling finish temperature, ° C.), CR refers to an average cooling rate (° C./sec) and CT refers to a coiling temperature (° C.).

TABLE 1

| Steel Type | Alloy Composition (wt %) | | | | | | | | | | |
|---|---|---|---|---|---|---|---|---|---|---|---|
| | C | Si | Mn | Cr | Al | P | S | N | Ti | Nb | B |
| CS 1 | 0.16 | 0.4 | 1.7 | 0.4 | 0.03 | 0.01 | 0.003 | 0.004 | 0.05 | 0.03 | 0.001 |
| CS 2 | 0.10 | 0.01 | 1.8 | 0.8 | 0.03 | 0.01 | 0.003 | 0.004 | 0.04 | 0.02 | 0.0015 |
| CS 3 | 0.07 | 0.2 | 2.5 | 0.5 | 0.04 | 0.01 | 0.002 | 0.005 | 0.06 | 0.04 | 0.0012 |

TABLE 1-continued

| Steel Type | Alloy Composition (wt %) | | | | | | | | | | |
|---|---|---|---|---|---|---|---|---|---|---|---|
| | C | Si | Mn | Cr | Al | P | S | N | Ti | Nb | B |
| CS 4 | 0.11 | 0.7 | 2.0 | 0.05 | 0.03 | 0.01 | 0.003 | 0.004 | 0.05 | 0.04 | 0.0015 |
| CS 5 | 0.11 | 0.7 | 2.0 | 0.1 | 0.03 | 0.01 | 0.003 | 0.004 | 0.05 | 0.03 | 0 |
| CS 6 | 0.12 | 0.1 | 2.1 | 0.4 | 0.03 | 0.01 | 0.003 | 0.003 | 0.02 | 0 | 0.002 |
| CS 7 | 0.12 | 0.2 | 2.0 | 0.7 | 0.04 | 0.01 | 0.003 | 0.003 | 0.0007 | 0.02 | 0.0015 |
| CS 8 | 0.13 | 0.2 | 2.1 | 0.8 | 0.04 | 0.01 | 0.003 | 0.003 | 0.05 | 0.05 | 0.0015 |
| CS 9 | 0.12 | 0.4 | 2.1 | 0.1 | 0.03 | 0.01 | 0.003 | 0.004 | 0.015 | 0.03 | 0.0015 |
| IS 1 | 0.07 | 0.5 | 1.9 | 0.5 | 0.03 | 0.01 | 0.003 | 0.004 | 0.05 | 0.03 | 0.002 |
| IS 2 | 0.08 | 0.7 | 2.1 | 0.4 | 0.03 | 0.01 | 0.003 | 0.0042 | 0.05 | 0.025 | 0.002 |
| IS 3 | 0.10 | 0.4 | 1.7 | 0.3 | 0.03 | 0.01 | 0.003 | 0.0035 | 0.06 | 0.035 | 0.0015 |
| IS 4 | 0.11 | 0.6 | 1.9 | 0.7 | 0.03 | 0.01 | 0.003 | 0.004 | 0.05 | 0.03 | 0.002 |
| IS 5 | 0.12 | 0.4 | 2.1 | 0.1 | 0.03 | 0.01 | 0.003 | 0.004 | 0.015 | 0.03 | 0.0015 |
| IS 6 | 0.07 | 0.15 | 2.0 | 0.8 | 0.03 | 0.01 | 0.003 | 0.004 | 0.04 | 0.03 | 0.0015 |
| IS 7 | 0.12 | 0.6 | 1.9 | 0.6 | 0.03 | 0.01 | 0.003 | 0.003 | 0.05 | 0.04 | 0.002 |

CS: Comparative Steel,
IS: Inventive Steel (In Table 1, Comparative Steels 4, 8, and 9 have alloy compositions satisfying the scope of the present disclosure, but manufacturing conditions thereof are outside the present disclosure in Table 2 below. Therefore, Comparative Steels 4, 8, and 9 are denoted as comparative steels.)

TABLE 2

| Steel Type | FDT (°C.) | CR (°C./s) | CT (°C.) | Relational Express 1 | | Relational Expression 2 | | |
|---|---|---|---|---|---|---|---|---|
| | | | | $CR_{Min}$ | Satisfactory | $CT_{Max}$ | $CT_{Min}$ | Satisfactory |
| CS 1 | 892 | 81 | 416 | 72 | ○ | 453 | 376 | ○ |
| CS 2 | 890 | 72 | 435 | 40 | ○ | 438 | 363 | ○ |
| CS 3 | 884 | 78 | 421 | 24 | ○ | 436 | 359 | ○ |
| CS 4 | 886 | 41 | 432 | 87 | x | 469 | 383 | ○ |
| CS 5 | 896 | 95 | 445 | 85 | ○ | 467 | 382 | ○ |
| CS 6 | 870 | 80 | 434 | 41 | ○ | 439 | 365 | ○ |
| CS 7 | 892 | 77 | 428 | 37 | ○ | 438 | 363 | ○ |
| CS 8 | 880 | 73 | 485 | 28 | ○ | 433 | 359 | x |
| CS 9 | 885 | 82 | 350 | 67 | ○ | 455 | 375 | x |
| IS 1 | 888 | 75 | 425 | 69 | ○ | 461 | 376 | ○ |
| IS 2 | 885 | 76 | 424 | 68 | ○ | 462 | 376 | ○ |
| IS 3 | 870 | 98 | 412 | 84 | ○ | 463 | 381 | ○ |
| IS 4 | 890 | 77 | 405 | 59 | ○ | 454 | 372 | ○ |
| IS 5 | 874 | 79 | 415 | 67 | ○ | 455 | 375 | ○ |
| IS 6 | 892 | 80 | 414 | 37 | ○ | 440 | 363 | ○ |
| IS 7 | 885 | 82 | 406 | 63 | ○ | 455 | 373 | ○ |

CS: Comparative Steel,
IS: Inventive Steel

For each steel sheet manufactured as described above, mechanical properties such as tensile strength (TS) and hardness (Hv) and shear workability were evaluated. In addition, microstructures were observed and results thereof are listed in Table 3 below.

Tensile strength was measured for each hot-rolled sheet and cold-rolled sheet, and hardness of the cold-rolled sheet was measured using a Vickers hardness tester (Micro-Vickers hardness value). In this case, the tensile strength was measured for specimens taken by JIS5 standard in a 0-degree direction with respect to the rolling direction, and was expressed as an average value of results of measurement performed four times in total. A hardness value was expressed as an average value of results of measurement performed ten times in total.

In addition, shear workability of the cold-rolled sheet was evaluated by punching each cold-rolled sheet using a circular die having a diameter of 80 mm with a clearance of 10%, performing a heat treatment on each cold-rolled sheet at a temperature of 200° C. for an hour, and measuring a maximum length (mm) of cracks formed in a cross-section of a sheared portion. Specifically, the length of the crack was measured from the results of observation using an optical microscope at magnifications of 50 and 100.

A partially elongated microstructure was formed during the cold-rolling process to make it difficult to accurately distinguish phases. However, since the microstructure of the hot-rolled sheet was not changed (transformed) by the cold-rolling process, a microstructure of each steel sheet was measured with respect to the hot-rolled sheet using a scanning electron microscope (SEM) in a thickness position of ¼t at a magnification of 3000, and a fraction of each phase was measured.

TABLE 3

| Steel Type | Microstructure (Area Fraction %) | | | | | | | Tensile Strength (MPa) | | Hardness (Hv) | MLC (mm) |
|---|---|---|---|---|---|---|---|---|---|---|---|
| | T-M | T-B | Y | M | F | P | B | HR Sheet | CR Sheet | | |
| CS 1 | 0 | 0 | 0 | 17 | 0 | 8 | 75 | 922 | 1344 | 382 | 0.25 |
| CS 2 | 9 | 91 | 0 | 0 | 0 | 0 | 0 | 836 | 1171 | 338 | 0.09 |
| CS 3 | 0 | 0 | 0 | 22 | 0 | 0 | 78 | 961 | 1376 | 392 | 0.18 |
| CS 4 | 0 | 0 | 8 | 6 | 12 | 0 | 74 | 904 | 1319 | 377 | 0.12 |
| CS 5 | 0 | 0 | 3 | 5 | 15 | 4 | 73 | 873 | 1295 | 358 | 0.12 |
| CS 6 | 0 | 0 | 4 | 5 | 0 | 6 | 85 | 910 | 1325 | 379 | 0.13 |
| CS 7 | 0 | 0 | 2 | 7 | 0 | 7 | 84 | 921 | 1336 | 380 | 0.11 |
| CS 8 | 0 | 0 | 0 | 0 | 8 | 18 | 74 | 846 | 1282 | 368 | 0.5 |
| CS 9 | 0 | 0 | 0 | 25 | 0 | 0 | 75 | 1009 | 1438 | 413 | 0.3 |
| IS 1 | 0 | 0 | 0 | 7 | 3 | 0 | 90 | 926 | 1362 | 386 | 0.04 |
| IS 2 | 0 | 0 | 0 | 4 | 0 | 0 | 96 | 994 | 1416 | 405 | 0.05 |
| IS 3 | 0 | 0 | 2 | 4 | 0 | 0 | 94 | 975 | 1397 | 398 | 0.06 |
| IS 4 | 0 | 0 | 1 | 6 | 0 | 0 | 93 | 1005 | 1427 | 407 | 0.08 |
| IS 5 | 0 | 0 | 0 | 9 | 0 | 0 | 91 | 988 | 1403 | 403 | 0.08 |
| IS 6 | 0 | 0 | 0 | 8 | 0 | 0 | 92 | 936 | 1365 | 392 | 0.07 |
| IS 7 | 0 | 0 | 2 | 5 | 0 | 0 | 93 | 1012 | 1434 | 409 | 0.09 |

CS: Comparative Steel,
IS: Inventive Steel
HR Sheet: Hot-Rolled Sheet,
CR Sheet: Cold-Rolled Sheet
MLC: Maximum Length of Cracks in Sheared Portion (In Table 3, T-M is tempered martensite, T-B is tempered bainite, y is austenite, M is martensite, F is ferrite, P is pearlite, and B is a bainite phase.)

As illustrated in Tables 1 to 3, Inventive Steels 1 to 7, satisfying all of the alloy composition and the manufacturing conditions proposed in the present disclosure, had a matrix structure formed as a bainite phase and secured not only ultra-high strength but also high hardness.

Moreover, in each of the above steels, a maximum length of cracks formed during a shearing process was 0.1 mm or less, and quality of a sheared portion was excellent.

Meanwhile, Comparative Steels 1 to 3 were outside the alloy composition proposed in the present disclosure. Carbon (C) was excessively added to Comparative Steel 1. After Comparative Steel 1 was cooled, a martensite phase and a pearlite phase were formed by the excessively added carbon in an untransformed phase. As a result, a length of a crack formed during shearing forming of a cold-rolled sheet was 0.25 mm, and shear workability was significantly poor.

Comparative Steel 2 contained an insufficient amount of silicon (Si). Due to formation of carbides while cooling and then coiling Comparative Steel 2, a tempered structure was observed in a final hot-rolled sheet. As a result, an increase in strength during a subsequent cold-rolling process was less, so that desired levels of strength and hardness were not secured.

Comparative Steel 3 contained an excessive amount of manganese (Mn). Due to high hardenability of manganese, most structures were formed as a bainite phase and a martensite phase after cooling Comparative Steel 3. A high fraction of the martensite phase caused structural non-uniformity. As a result, excessive cracking occurred in a sheared portion.

Comparative Steel 4 satisfied the alloy composition proposed in the present disclosure, but a cooling rate during a cooling process thereof did not satisfy Relational Expression 1 of the present disclosure. Due to a low cooling rate, a ferrite phase was formed and a MA (martensite-austenite constituent) phase was excessively formed. Thus, a desired level of strength was not secured and shear workability was poor.

Comparative Steel 5 did not contain boron (B). Although a cooling process after a hot-rolling process satisfied the proposal of the present disclosure, a ferrite phase and a pearlite phase were formed in a microstructure. Thus, desired levels of strength and hardness were secured, and cracking severely occurred due to structural non-uniformity during a shearing process.

Each of Comparative Steels 6 and 7 contained an insufficient amount of niobium (Nb) and titanium (Ti), precipitate forming elements. In each of Comparative Steels 6 and 7, a microstructure was non-uniform, and a pearlite phase and an MA phase were excessively formed. As a result, a desired level of strength was not secured and shear workability was poor.

Each of Comparative steels 8 and 9 satisfied the alloy composition proposed in the present disclosure, but a cooling end temperature (a coiling temperature) during a cooling process thereof did not satisfy Relational Expression 2 of the present disclosure. The cooling end temperature of Comparative Steel 8 was so high that a pearlite phase was excessively formed in a microstructure, and thus, a bainite phase was insufficiently formed. Accordingly, a desired level of strength was not secured and shear workability was poor. The cooling end temperature of Comparative Steel 9 was so low that a martensite phase was excessively formed in a microstructure. Accordingly, ultra-high strength could be secured, but shear workability was poor.

FIG. 1 is an image illustrating microstructures of inventive steel (Inventive Steel 5) "A" according to the present disclosure, and precipitation strengthening steel "B" and complex-phase steel "C" manufactured from a manufacturing process of the related art.

The term "manufacturing process of the related art" refers to all conventional processes for manufacturing a cold-rolled steel sheet, for example, a hot-rolling process, a (pickling and) cold-rolling process, and an annealing heat treatment process, and conditions for manufacturing the precipitation strengthening steel and the complex-phase steel through the respective processes are well known in the art, and thus, detailed description thereof will be omitted.

As can be seen from FIG. 1, in the steel "A" of the present disclosure, a bainite phase was formed as a matrix structure, a fraction of a martensite phase was 10% or less, and a small amount of carbide was finely formed.

Unlike this, in conventional steel 1, for example, the precipitation strengthening steel "B" having a microstructure including ferrite and pearlite, a significantly elongated pearlite phase was observed and coarse carbides were included. Since such coarse carbides are mainly developed along grain boundaries, it may be difficult to control a maximum size of cracks during a shearing process to be 0.1 mm or less, which can be inferred from the results of Comparative Steels 5 and 8 of the present disclosure.

In addition, it can be seen that the complex-phase steel "C" corresponding to conventional steel 2 mainly includes a coarse martensite phase, and includes an MA phase disadvantageous to shearing characteristics. Since the coarse martensite phase and the MA phase cause structure non-uniformity, it may also be difficult to control a maximum size of cracks during a shearing process to be 0.1 mm or less, which can be inferred from the results of Comparative Steels 3 and 9 of the present disclosure.

As described so far, according to the present disclosure, not only strength and hardness of a cold-rolled steel sheet, not subjected to an annealing heat treatment, but also shearing characteristics thereof may be excellently secured. In particular, when a hot-rolled sheet is cold-rolled, occurrence of cracking in an edge portion may be suppressed during the rolling process in spite of a high cold reduction ratio, and cracking occurring during a shearing process may be significantly reduced.

The invention claimed is:

1. A steel sheet having excellent shear workability, the steel sheet comprising, by weight %,
carbon (C): 0.06 to 0.14%,
silicon (Si): 0.1 to 0.8%,
manganese (Mn): 1.8 to 2.2%,
chromium (Cr): 0.005 to 0.8%,
phosphorus (P): 0.001 to 0.05%,
sulfur (S): 0.001 to 0.01%,
aluminum (Al): 0.01 to 0.1%,
nitrogen (N): 0.001 to 0.01%,
titanium (Ti): 0.01 to 0.06%,
niobium (Nb): 0.005 to 0.06%,
boron (B): 0.0003 to 0.0050%, and
a balance of iron (Fe) and unavoidable impurities,
wherein the steel sheet has a microstructure that includes:
a bainite phase in an area fraction of 80% or more,
a martensite phase in an area fraction of 10% or less, and
at least one of a retained austenite phase, a ferrite phase, and a pearlite phase as a remainder,
wherein a maximum length of cracks formed during a shearing process is 0.1 mm or less,
wherein the steel sheet has tensile strength of 1350 MPa or more and a Vickers hardness value of 360 Hv or more.

2. The steel sheet of claim 1, wherein the steel sheet includes pearlite including carbides, each having an equivalent circular diameter of 0.1 μm or more, in an area fraction of less than 5%.

3. A method for manufacturing a steel sheet having excellent shear workability, the method comprising:
heating a steel slab including, by weight %,
carbon (C): 0.06 to 0.14%,
silicon (Si): 0.1 to 0.8%,
manganese (Mn): 1.8 to 2.2%,
chromium (Cr): 0.005 to 0.8%,
phosphorus (P): 0.001 to 0.05%,
sulfur (S): 0.001 to 0.01%,
aluminum (Al): 0.01 to 0.1%,
nitrogen (N): 0.001 to 0.01%,
titanium (Ti): 0.01 to 0.06%,
niobium (Nb): 0.005 to 0.06%,
boron (B): 0.0003 to 0.0050%, and
a balance of iron (Fe) and unavoidable impurities;
finish-rolling the heated steel slab within a temperature range of 800 to 1150° C. to manufacture a hot-rolled steel sheet;
cooling the hot-rolled steel sheet, and then coiling the cooled hot-rolled steel sheet; and
cold-rolling the coiled hot-rolled steel sheet to manufacture a cold-rolled steel sheet,
wherein the cooling is performed at an average cooling rate $CR_{Min}$ (C/s), obtained by Relation Expression 1 below, or higher, and is performed to a temperature between $CT_{Min}$ (° C.) and $CT_{Max}$ (° C.) obtained by Relational Expression 2 below, $$CR_{Min}=190-(105\times[C])+(35\times[Si])-(58\times[Mn])-(46\times[Cr])+(15\times[Ti])+(50\times[Nb])-(150\times[B]) \quad [\text{Relational Expression 1}]$$

$$CT_{Max}=510-(120\times[C])+(30\times[Si])-(25\times[Mn])-(22\times[Cr])+(8.5\times[Ti])+(14\times[Nb])+(805\times[B])$$

$$CT_{Min}=420-(45.3\times[C])+(16\times[Si])-(21\times[Mn])-(18\times[Cr]) \quad [\text{Relational Expression 2}]$$

where each element denotes a content by weight %, and wherein an increase of strength by the cold rolling (reduction ratio, %) is 6 MPa/1% or more.

4. The method of claim 3, wherein the heating of the steel slab is performed within a temperature range of 1100 to 1350° C.

5. The method of claim 3, wherein the cold-rolling is performed at a cold reduction ratio of 60 to 80%.

6. The steel sheet of claim 1, comprising, by weight %, chromium (Cr): 0.3 to 0.8%.

7. The steel sheet of claim 1, comprising, by weight %, titanium (Ti): 0.01 to 0.04%.

* * * * *